Oct. 7, 1952 S. J. LEVESQUE 2,612,993
POTATO SEPARATOR

Filed Dec. 30, 1947 6 Sheets-Sheet 1

INVENTOR.
Simon J. Levesque
BY
McMorrow, Berman & Davidson
ATTORNEYS

Oct. 7, 1952    S. J. LEVESQUE    2,612,993
POTATO SEPARATOR
Filed Dec. 30, 1947    6 Sheets-Sheet 2

Fig. 2.

INVENTOR.
Simon J. Levesque
BY
McMorrow, Berman, & Davidson
ATTORNEYS

Oct. 7, 1952 S. J. LEVESQUE 2,612,993
POTATO SEPARATOR
Filed Dec. 30, 1947 6 Sheets-Sheet 4

INVENTOR.
Simon J. Levesque
BY
McMorrow, Berman & Davidson
ATTORNEYS

Oct. 7, 1952  S. J. LEVESQUE  2,612,993
POTATO SEPARATOR

Filed Dec. 30, 1947  6 Sheets-Sheet 5

INVENTOR.
Simon J. Levesque
BY
McMorrow, Berman & Davidson
ATTORNEYS

Oct. 7, 1952 S. J. LEVESQUE 2,612,993
POTATO SEPARATOR
Filed Dec. 30, 1947 6 Sheets-Sheet 6

INVENTOR.
Simon J. Levesque
BY
McMorrow, Berman & Davidson
ATTORNEYS

Patented Oct. 7, 1952

2,612,993

UNITED STATES PATENT OFFICE 2,612,993

POTATO SEPARATOR

Simon J. Levesque, St. Leonard, New Brunswick, Canada

Application December 30, 1947, Serial No. 794,655

2 Claims. (Cl. 209—32)

This invention relates to improvements in potato-digging apparatus, and is more particularly directed to the provision of an efficient and conveniently operable mechanism whereby potatoes or other grown material may not only be most readily removed from their home soil, but may be conveyed to means capable of selectively separating them from spoil.

It is, of course, well known that potatoes or the like are of variable size and form, and when the same are grown in a sandy soil which contains stones or other obstructions of approximately the same size as the objects to be removed therefrom, it is desirable that the potatoes or the like be removed from the soil without seriously bruising or in any other manner injuring them through handling. As will appear, the construction of the invention is such that the objects being removed from the soil are readily and efficiently conveyed to a suitable container in such a way that such objects are not only protected against bruises or other injury during handling, but also are separated from light spoil, such as dirt, vines, and as well as from heavy spoil, such as rocks or stones, with the resultant end that there are discharged stacks or piles of the desired objects, such as potatoes, which are substantially free of spoil, as is necessary for efficient and economical production of such material from a farm, garden or the like with which the device disclosed hereinafter is concerned.

It has long been the practice, in the harvesting of a garden area for which the apparatus of this invention is particularly adapted, to utilize manual labor for the picking of the potatoes or other objects out of the soil and subsequently sorting the same according to size and from spoil, and a very definite disadvantage results from such practice in associating with potatoes or other objects a certain accumulation of stones or other objectionable material. Obviously, the inclusion in an accumulation of potatoes of vines, stones, sand, or any other type of spoil will not only make it difficult to sort the same once they have arrived at their discharging station, but may very easily render the picking mechanism unusable.

It has been known to provide a potato digger in association with a tractor or the like, but such devices heretofore known have always been towed by the tractor or other vehicle. It is a special feature of this invention to provide a novel apparatus which is capable of doing the same job heretofore done by the horse or tractor-drawn digger now commonly used which will be actually mounted on the tractor, and, as will appear, the device is less cumbersome and easier to handle than prior devices.

It is, accordingly, a principal object of the invention to provide a digging apparatus which may be operated by one man, the tractor driver being the usual operator, as distinguished from the prior practice of employing a relatively large number of persons to dig the potatoes, or the utilization of a complicated towed mechanism requiring the constant attention of several employes.

Still a further object of the invention is to provide means whereby the main axle of a tractor or other vehicle may be utilized to power-drive the same, and there is provided a special arrangement whereby the vehicle may be properly connected to the apparatus of the invention in order that the same may be moved with the tractor as a unit over the surface being operated upon.

It is still a further object of the invention to provide a potato-digging apparatus which is both labor-saving and requires a minimum amount of effort in the operation of the same, and it is a special feature that there is provided means whereby the potatoes or other objects may be quickly and easily removed from the natural soil. It will be appreciated that the potatoes, stones, vines, and any other rubbish which might fall from the digger will inevitably be removed by the conveying means above referred to, and which will presently be described.

Still a further object of the invention is to provide an apparatus which is capable of removing potatoes or other objects from the soil and depositing them on a conveying belt, on a towed vehicle, in such a way that the same are readily and efficiently separated from spoil by suitable automatic means under the control of a single operator.

It is a further object to provide a novel combination comprising a tractor-mounted digger with a tractor-drawn sorter, separator and packer.

It is a further object to provide a novel apparatus adapted to be towed by a tractor for sorting potatoes and separating them from spoil and delivering the separated potatoes to a packing station.

Other objects and advantages of the invention will become more apparent after a reading of the following description, and reference will be had therein to the accompanying drawings, wherein:

Figure 1 is a side elevational view showing the apparatus of the invention in assembled relation with respect to a vehicle, such as a tractor or the like;

Figure 14 is a top plan view of a hydraulic draft means.

It should be here pointed out that under present practice it has been common to employ as many as twenty men to obtain anything equal to an efficient potato-digging operation of a single row of potatoes under even the most ideal conditions. When a breakdown occurs with the conventional apparatus, it is obvious that the several men commonly employed upon the same are, therefore, idle, in addition to the fact that the apparatus itself is no longer capable of efficient operation. Consequently, when events require that the operators cease work during the seasonal period when potatoes in particular are ready for digging, there is a tremendous economic and financial loss, since unpicked potatoes, once wet, are practically useless to the farmer.

Referring now to the drawings more in detail, the invention will be fully described.

As previously stated, stones, vines and other spoil are inevitably picked up by a digger construction of the type here involved, along with the more desirable objects. In the device of the invention means are provided whereby the potatoes which are dug up from the ground are transferred onto, and are conveyed upwardly along, a slatted endless belt or the like which runs along a side of the device, so as to be sorted and separated from sand or small potatoes, and thereafter deposited on an upper conveyor while being subjected to an upwardly-directed air blast to eliminate residual sand, vines and other light spoil. They are then subjected to a transverse air blast which blows the potatoes off of the last-named conveyor, leaving stones, rocks and other heavy spoil thereon. Thereafter, the sorted and separated potatoes are delivered by a final conveyor to a packing station for packing in suitable shipping containers, such as barrels or sacks.

Figure 1:
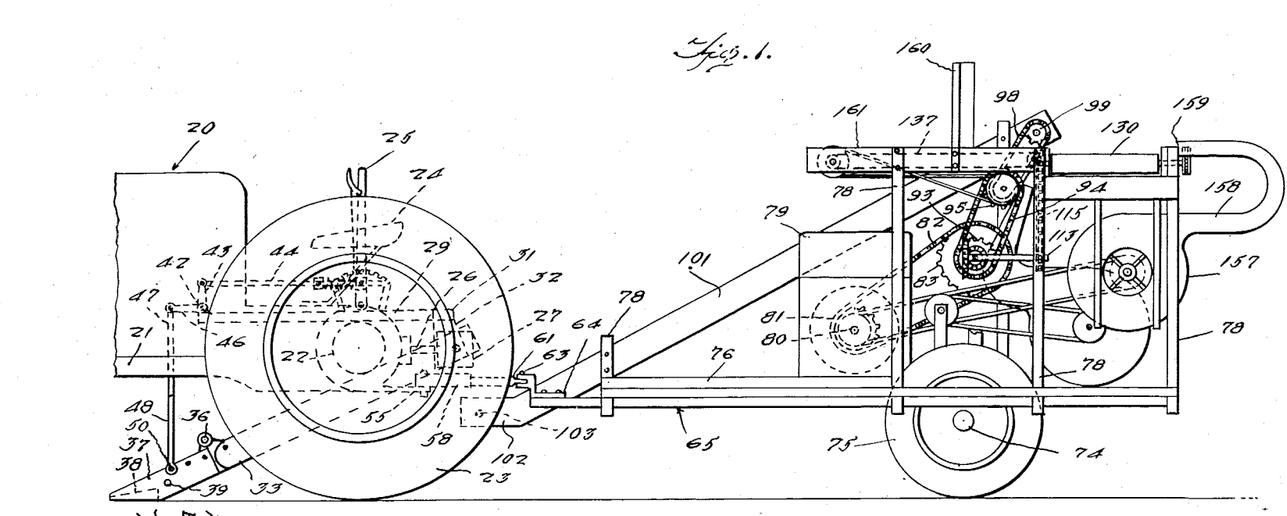
Figure 1A:
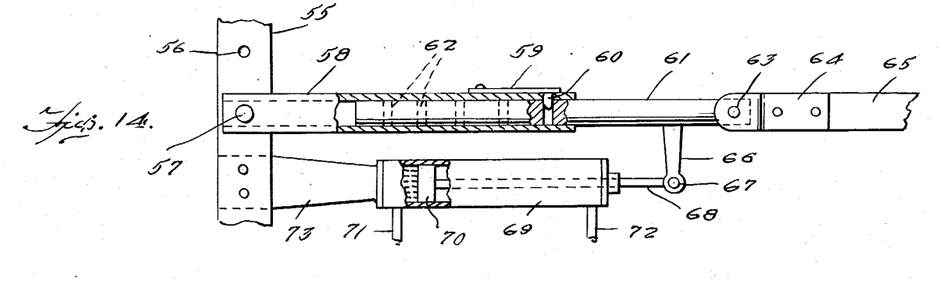
Figure 2:
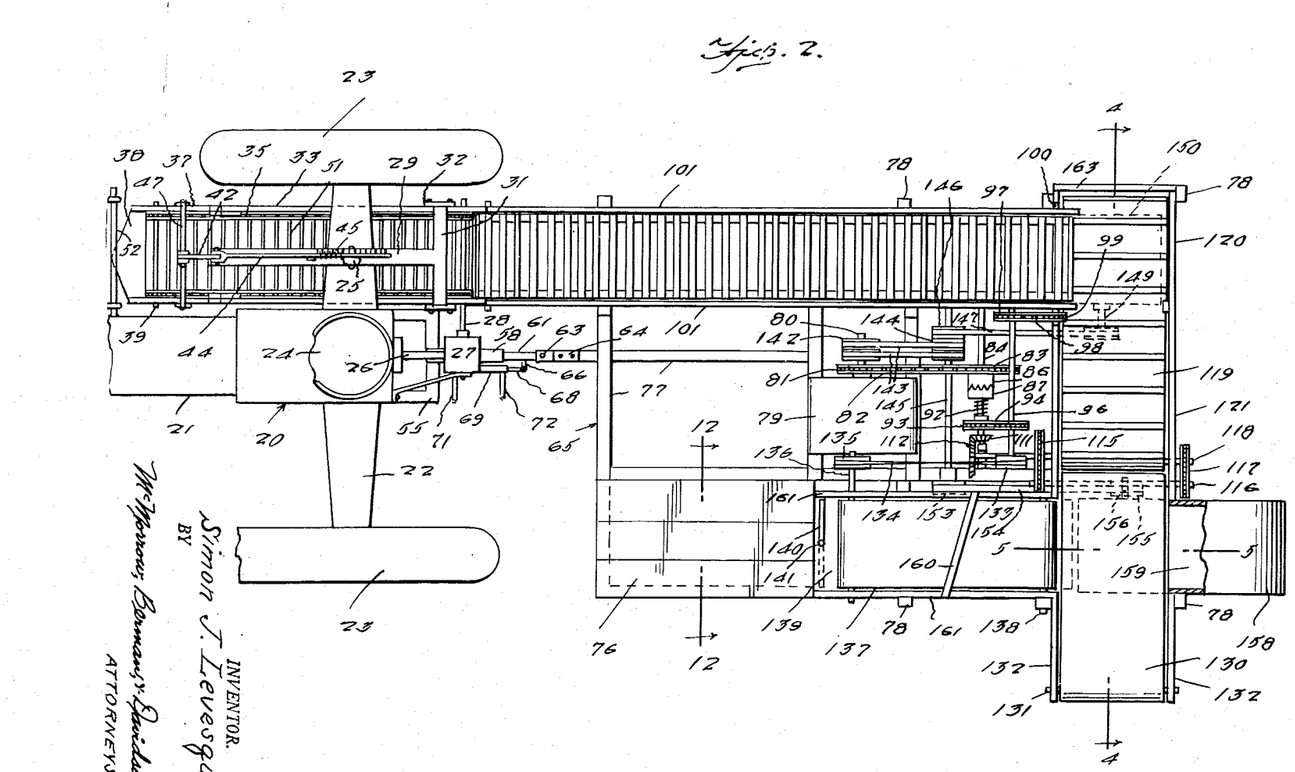
Figure 2 is a top plan view of the apparatus as shown in assembled relation in Figure 1.
Figure 3:
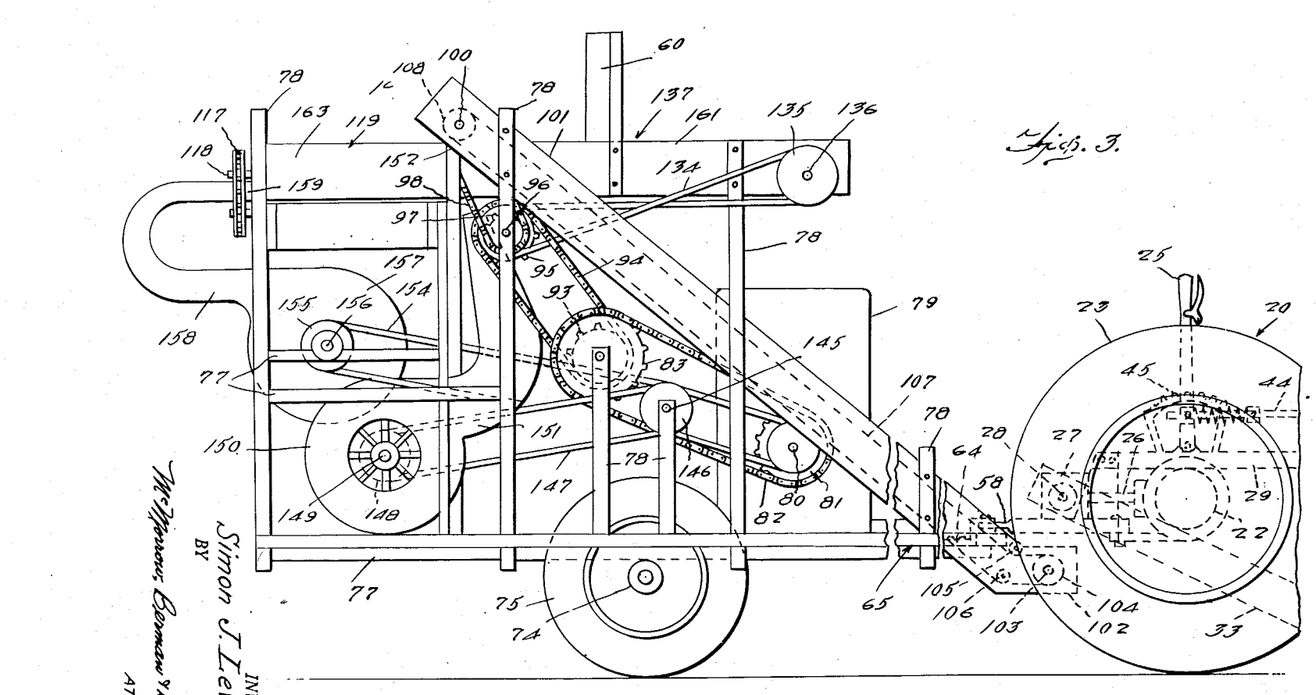
Figure 3 is an opposite side elevational view of the apparatus shown in Figure 1.
Figure 6:
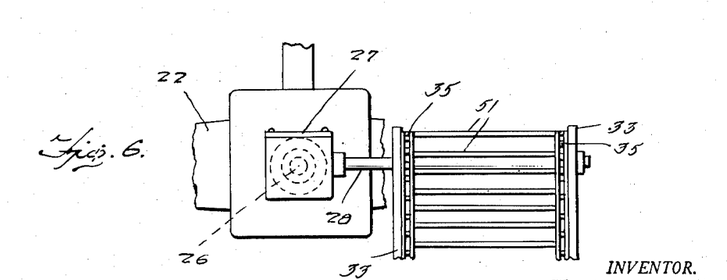
Figure 6 is a partial top plan view of the drive mechanism for the digger.
Figures 7, 13:
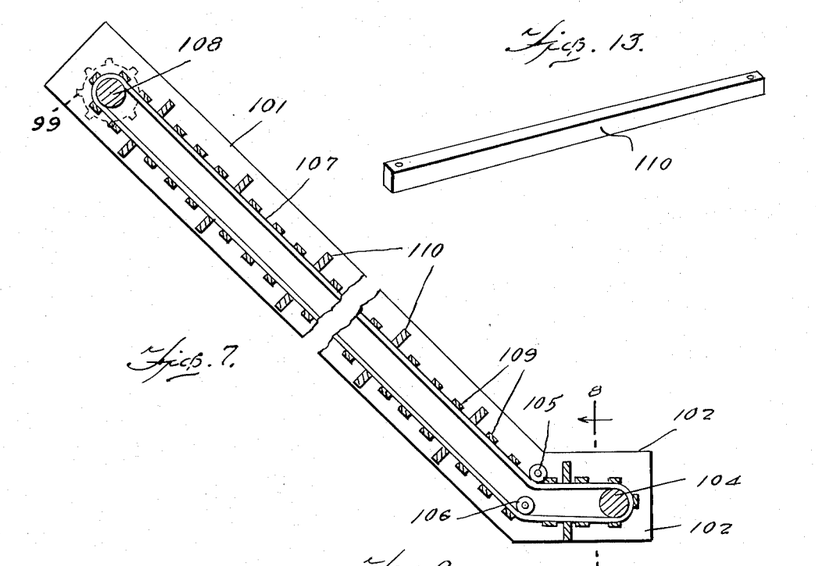
Figure 7 is an enlarged longitudinal vertical sectional view, with parts broken away, of the main conveyor device of the invention and taken substantially on the plane of the line 7—7 of Figure 2.
Figure 13 is a perspective view of one of the carrying conveyor cleats.
Figure 8:
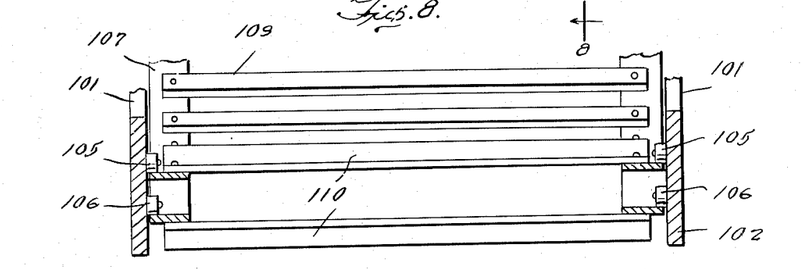
Figure 8 is a transverse vertical sectional view on the plane of the line 8—8 of Figure 7.

The device according to my invention comprises a digger which includes a conveyor, both of which are mounted directly on a tractor. Such digger and conveyor are best illustrated in Figures 1, 2, 9 and 10, and to some extent in Figures 3 and 6. The device also comprises a trailer adapted to be towed by a tractor and which includes one or more conveyors and means for cleaning and sorting potatoes received from the digger conveyor. This portion of the invention is best illustrated in Figures 1, 2 and 3, with details being shown in certain of the other figures. The provision of a separate digger and conveyor carried by the tractor enables potatoes to be dug in terrain too difficult to permit the passage thereover of a tractor and trailer, and which types of terrain have heretofore been harvested by hand. With the present arrangement, although the sorting and packing must be done by hand, it is possible to mechanically dig the potatoes by the tractor attachment in any terrain which can be traversed by a tractor by itself.

Referring specifically to the drawings, wherein like reference characters have been used throughout to designate like parts, and referring more particularly to the digger attachment disclosed in Figures 1, 2, 3, 6, 9 and 10, 20 designates generally any suitable tractor having a frame 21, a rear axle 22, and rear wheels 23. The tractor frame 21 has mounted thereon adjacent the rear axle 22 any suitable seat 24 for an operator. Conveniently located adjacent the seat 24 is a hand lever 25, the purpose of which will be described later. The tractor 20 includes a rearwardly-directed power take-off shaft 26 which extends rearwardly of the rear axle 22. The take-off shaft 26 leads to a gear box 27 of any suitable form and which includes any suitable gears and a laterally-directed driven shaft 28. The driven shaft 28 drives the tractor-carried conveyor about to be described.

Figure 9:
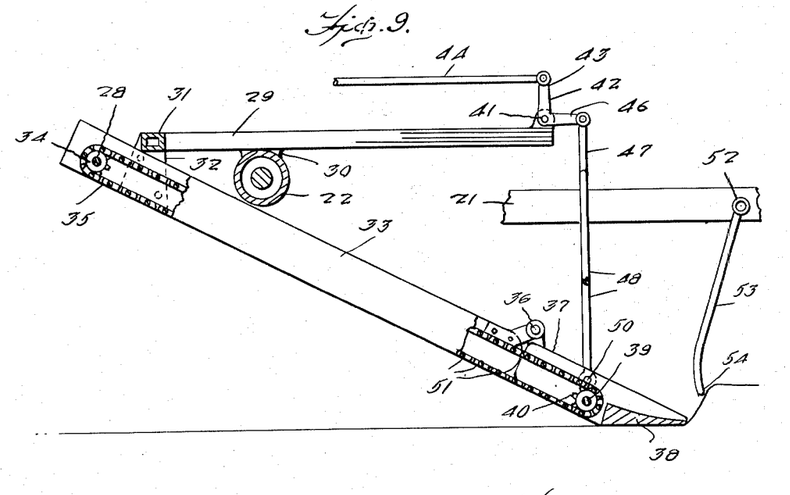
Figure 9 is a fragmentary side elevational view of the digger and its conveyor, parts being broken away and shown in longitudinal vertical section.

The digger attachment according to the invention comprises an auxiliary frame member 29 which is secured atop the rear axle housing 22 in any suitable manner, as by being welded thereto, as at 30, Figure 9. The rear end of the frame member 29 terminates in a transversely disposed cross-piece 31, the free ends of which terminate in depending lugs 32. Each of the lugs 32 has secured thereto a forwardly and downwardly directed rail 33. The outer end of the drive shaft 28 extends through the rails 33 and is journaled therein. As is apparent from Figure 2, the auxiliary frame 29, crosspiece 31 and rails 33 are disposed at one side of the tractor frame between one of the rear wheels 23 and the frame. Thus, the provision of this attachment does not increase the width of the tractor.

The rails 33 extend forwardly and downwardly just below the rear axle housing 22, Figure 9. The rear ends of the rails are rigidly supported by the lugs 32 and upward movement of the rails is eliminated by their bearing against the under surface of the axle housing 22. If necessary, the rails may be held in engagement with the axle housing 22 by any suitable means, not shown. That portion of the drive shaft 28 which extends between the rails 33 has fixed thereon in any suitable manner a pair of laterally-spaced drive sprockets 34 around which extend conveyor chains 35. The forward end of each rail 33 is pivoted in any suitable manner, as at 36, to a forwardly and downwardly directed digger rail 37. The forward ends of the digger rails 37 are connected by a substantially horizontally-disposed digger scoop 38 of any suitable form. The digger rails 37 have journaled therein an idler shaft 39 which has fixed thereon between the rails in laterally-spaced relation a pair of idler sprockets 40 around which the lower end loops of the conveyor chains 35 extend. The pivots 36 are of a type which permits upward movement of the digger rails 37, Figure 9, but does not permit downward movement beyond the position shown in Figure 9.

The forward end of the auxiliary frame 29 has pivoted thereto in any suitable manner, as at 41, the fulcrum of a bell crank lever 42. One arm 43 of the bell crank lever 42 has pivoted thereto the forward end of a link 44, the rear end of which is pivotally connected in any suitable manner to the hand lever 25. The hand lever 25 below the connection with the link 44 is pivoted to the auxiliary frame 29 in any usual manner, and is engageable with a typical toothed quadrant 45 whereby the lever 25 may be locked in adjusted position. The other lever arm 46 of the bell crank 42 is pivotally connected to the upper end of a yoke 47 which includes a pair of laterally-spaced depending legs 48. The lower ends of the legs 48 are pivoted, as at 50, to the digger side rails 37 forwardly of the pivotal connection 36 with the conveyor rails 33. The conveyor chains 35 are connected by a plurality of longitudinally-spaced conveyor slats or lifts 51, whereby to provide an open type of endless conveyor. This type of conveyor being open sifts out a certain amount of the finer spoil scooped up by the scoop 38. Thus, a certain amount of fine spoil, such as sand, dry earth and possibly small stones, fall through the open conveyor to the ground. The remainder of the coarser spoil, together with the potatoes contained therein, are transmitted rearwardly along the conveyor and discharged over the rear end thereof. When the digger scoop 38 is not to be used, as when the tractor is traveling to and from a field, the hand lever 25 is pulled to a rearward position and locked on the quadrant 45 in a known manner. This operation raises the forwardly-directed bell crank arm 46, together with the yoke 47, digger rails 37 and the digger 38. Also, the quadrant 45 permits the depth into the ground to which the digger 38 is to extend to be regulated within defined limits.

Figure 10:
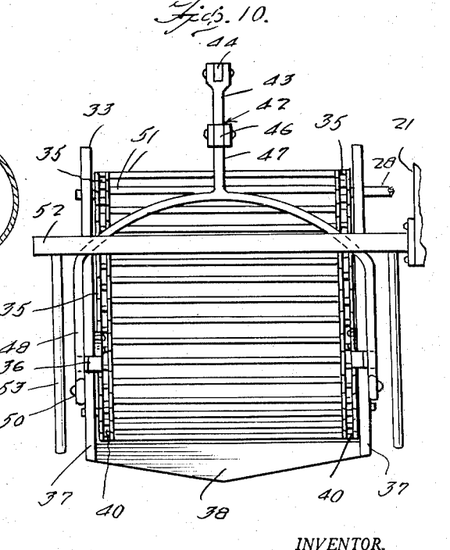
Figure 10 is a front elevational view of the digger and its conveyor of Figure 9.

As best seen in Figures 9 and 10, a rod or arm 52 extends laterally of the tractor frame 21 forwardly of the digger scoop 38. The rod or arm 52 has mounted thereon a pair of depending fingers 53, the forward ends of which are forwardly-directed, as at 54. The fingers 53 yieldingly engage the ground on either side of the digger scoop 38 and forwardly thereof to pick up potato vines or the like which might conceivably impede the action of the scoop. When the digger is not operating, the fingers 53 are adapted to be swung forwardly or rearwardly on the arm 52 relative to the tractor frame 21, whereby they may be positioned out of a ground-engaging position.

Obviously, the portion of the invention just described is capable of operating independently with the tractor to dig potatoes and deposit them rearwardly of the tractor for manual sorting. However, the portion of the invention just described is specifically adapted for use with a particular trailer now to be described. In practice, the digger portion of the invention would be used independently of the trailer only when it is necessary to operate on terrain over which the trailer could not be drawn.

The tractor frame 21 has secured thereto in any suitable manner rearwardly of the rear axle housing 22 a draw bar 55 which is best seen in Figures 1, 2 and 14. The draw bar 55 may be substantially U-shaped in plan, Figure 2, and the bight thereof is provided with a plurality of laterally-spaced apertures 56 therethrough for the reception of pins 57 which pivotally attach a preferably tubular tow bar 58 thereto. The tow bar 58 extends rearwardly of the draw bar 55 and has secured on one side thereof a spring latch 59 terminating in an inwardly-directed latch finger 60. The tow bar 58 slidably receives a forward end of a tow rod 61 for the trailer. The tow rod 61 is provided with a plurality of longitudinally-spaced, transversely-extending apertures 62 therethrough for the reception of the latch finger 60. The rear end of the tow rod 61 is pivotally connected, as at 63, to an upwardly-offset free end of a bracket member 64, the rear end of which is fixedly connected to the frame 65 for the trailer. The tow rod 61 intermediate the pivot 63 and the forward end thereof has fixed thereon a laterally-extending arm 66, the free end of which is pivoted, as at 67, to the free end of a piston rod 68. The piston rod is slidable through the end wall of a hydraulic cylinder 69 and has fixed on the inner end thereof a piston 70. Cylinder 69 is supplied with hydraulic fluid under pressure at each end thereof by conduits 71 and 72 which are operatively connected to the hydraulic system of the tractor 20 in any suitable manner, not shown, whereby the piston 70 may be selectively driven in either direction relative to the cylinder 69. The cylinder 69 is fixed to the draw bar 55 by any suitable bracket 73. The purpose of the particular hitch shown and described here is to enable the trailer to be adjusted relative to the tractor in forward and rearward directions, whereby to position the cooperating parts of the digger and trailer properly. Thus, with the latch 59 and latch finger 60 disengaged from the tow rod 61, the admission of hydraulic fluid under pressure to the cylinder 69 through one of the conduits 71 and 72 will operate to move the trailer either forwardly or rearwardly relative to the tractor. This maneuver will position an appropriate aperture 62 of the tow rod in alignment with the latch finger 60, whereby to properly locate the trailer rearwardly of the tractor. This form of adjustment is obviously capable of great flexibility and fine adjustments. Moreover, it eliminates the necessity for backing the tractor or manually moving the trailer to achieve such fine adjustments.

The trailer according to the invention is best seen in Figures 1, 2 and 3, with details being shown in other views, and comprises a suitable horizontally disposed frame 65 composed of suitable horizontally disposed frame members 77 and vertical frame members 78 which are supported by a suitable axle 74 and ground-engaging wheels 75. A portion of the frame 65 may be covered by flooring 76 to provide a platform for potato-storing receptacles and/or to provide a foothold for an operator.

The trailer frame 65 has mounted thereon an independent power unit 79 which preferably comprises an internal combustion engine of any suitable type. The engine 79 is provided with a drive shaft 80 to which is fixedly secured a drive sprocket 81 which bears an endless chain or the like 82 which extends around a driven sprocket 83 on a counter-shaft 84. The counter-shaft 84 is provided with a suitable slip-clutch 85 which comprises a hub 86 having double-beveled clutch teeth 88 which have a slip engagement with complementary double-beveled teeth 89 carried by a driven clutch member 87. The driven clutch member 87 is keyed to a driven shaft 90 in any suitable manner, as by a key 91. A coil spring 92 is concentrically disposed about the driven shaft 90 and bears against the outer surface of the driven clutch member 87 to maintain the teeth 88 and 89 normally engaged. Obviously, if any obstruction is encountered in any of the means, to be described later, driven by the driven shaft 90, the spring 92 will yield and permit the clutch 85 to slip and thereby avoid damage to the various parts. The counter-shaft 84, together with the slip-clutch 85 and related parts is best seen in Figure 11.

The driven shaft 90 has fixed thereon a driven sprocket 93, the hub of which provides an abutment for one end of the coil spring 92 aforesaid. The driven sprocket 93 carrying a chain 94 drives a further sprocket 95 on a shaft 96. The shaft 96 is journaled in suitable vertical frame members 78 and also carries a sprocket 97 fixedly thereon which in turn drives through a chain 98 a conveyor drive sprocket 99 on a shaft 100. The shaft 100 is journaled in a pair of laterally-spaced conveyor rails 101 adjacent the upper ends thereof. The conveyor rails 101 extend longitudinally of the frame 65 forwardly and downwardly and are suitably secured to vertical frame members 78. The lower ends of the frame rails 101 are positioned in alignment with and slightly forwardly of and below the rear end portions of the conveyor rails 27 of the tractor digger conveyor.

As aforesaid, the forward ends 102 of the conveyor rails 101 provide horizontally-disposed extensions, the free ends of which have journaled therein a cross idler shaft 103. The idler shaft 103 has fixed thereon in any suitable manner a pair of laterally-spaced idler sprockets or rollers 104 to receive the conveyor chains 107. A further pair of upper and lower idler sprockets 105 and 106 is provided for each chain, whereby to cause a forwardly terminal portion of the runs of the chains to extend horizontally through the horizontally-disposed portions 102 of the rails. The upper ends of the rails 101, as aforesaid, have journaled therein the sprocket drive shaft 100 which has mounted thereon between the rails a pair of laterally-spaced drive sprockets 108 around which the conveyor chains 107 extend. The conveyor chains 107 are connected by longitudinally-spaced supporting slats 109 which are relatively closely spaced to prevent the falling of potatoes or the like through the conveyor. At substantially greater intervals and interposed between adjacent support slats 109 there is provided a plurality of transporting slats or lifts 110. Such lifts 110 extend substantially further outwardly from the conveyor whereby to support the potatoes and the like as they travel upwardly with the chains 107. As is clearly seen in Figures 1, 2 and 3, potatoes and the like, together with any spoil accompanying the same, drop off of the rear end of the digger conveyor previously described and onto the horizontal portion of the last-described conveyor between the horizontal terminal portions 102 of the side rails 101. As the upper runs of the chains 107 are ascending, such potatoes and spoil are carried upwardly between the rails 101 and are discharged past the upper ends thereof. During such passage upwardly along this last-named conveyor additional light or fine spoil, capable of passing between the slats 109, falls to the ground together with any potatoes of small size. However, the potato vines, together with any large spoil and all of the large potatoes, are retained on the conveyor and discharged over the upper end, as aforesaid.

Figure 11:
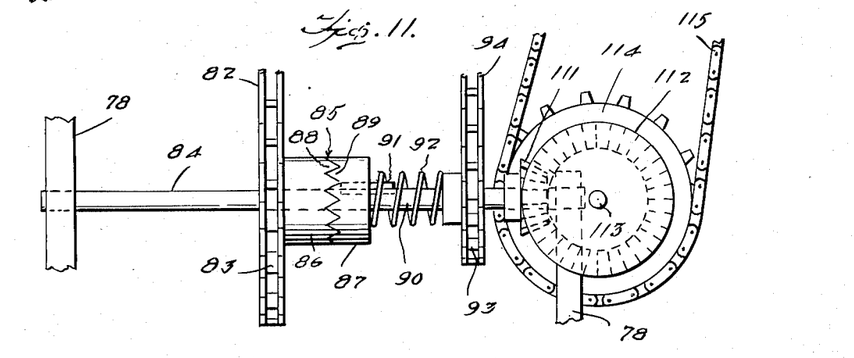
Figure 11 is a fragmentary side elevational view of the driving mechanisms for the sorter and separator, with parts in section.
Figure 12:
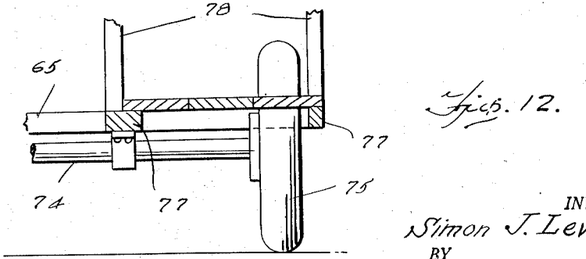
Figure 12 is a transverse vertical sectional view on the plane of the line 12—12 of Figure 2.

As best shown in Figures 2 and 11, the driven shaft 90 extends laterally outwardly of the driven sprocket 93 and has fixed thereon for rotation therewith a bevel pinion 111 which is in mesh with a bevel gear 112 which is fixed on a longitudinally-extending shaft 113. The shaft 113 has fixed thereon rearwardly of the bevel gear 112 a sprocket 114 which, through a chain 115, drives a longitudinally-directed shaft 116 through a sprocket connection therewith. The shaft 116 is effective to drive a transverse conveyor 130 and through a chain 117 and a second transverse shaft 118, all connected by suitable sprockets, drives an additional horizontally disposed transverse conveyor 119.

Figure 4:
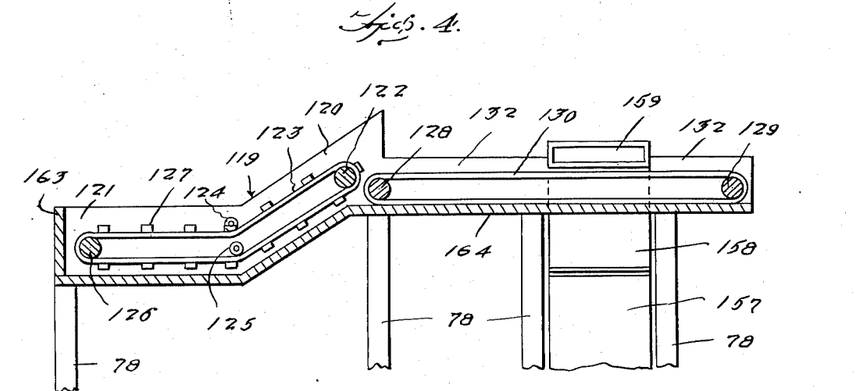
Figure 4 is a fragmentary sectional view on the plane of the line 4—4 of Figure 2.
Figure 5:
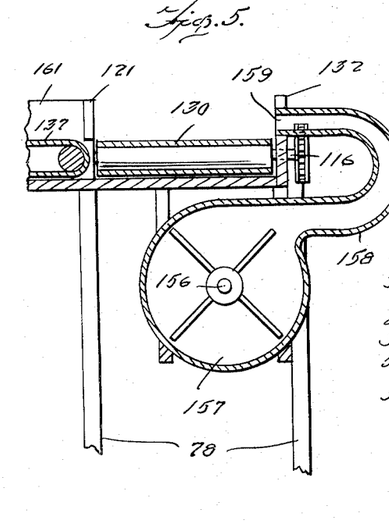
Figure 5 is a fragmentary sectional view on the plane of the line 5—5 of Figure 2.

The conveyor 119 comprises a pair of spaced side rails, the shape of which is best seen in Figure 4. Such side rails comprise a horizontally-disposed portion and an upwardly and laterally-inclined portion designated by 121 and 120, respectively. The horizontally-disposed portions 121 are disposed transversely of and below the rearward end of the conveyor side rails 101. Also, the forwardmost side rail portion 121 is slightly inwardly of the rear end of the conveyor side rails 101, whereby material transported off of the end of such conveyor will fall by gravity onto the horizontal end of the conveyor 119. An end rail 162 connects the outer free ends of rail portions 121. Suitable sprockets 122 on the shaft 118 drive an endless conveyor belt 123, suitable upper and lower idler gears 124 and 125, respectively, transmit the upper and lower runs of the belt 123 first over a horizontal path and then upwardly to the shaft 118. A pair of idler sprockets 126 are located at the left-hand end, Figure 4, of the horizontal portion of the conveyor 119. The belt 123 may be provided with suitable lifts or slats 127 which are substantially widely spaced. This particular conveyor is not of the open type in that the belt 123 is substantially non-porous. As is clearly apparent from Figure 2, material carried up the first-mentioned conveyor of the trailer will be deposited upon the conveyor 119. The shaft 116 aforesaid drives a suitable driven sprocket or roller 128 of the conveyor 130 which comprises a belt of substantially non-porous material which extends horizontally from the inner end of the conveyor 119. The opposite end of the conveyor 130 extends around an idler roller or sprocket 129. The inner end of the upper run of the conveyor 130 is positioned slightly below the inner end of the upwardly-inclined run of the conveyor belt 123, whereby material conveyed by the conveyor 119 is deposited upon the inner end of the conveyor 130. The outer rollers or sprockets 129 are fixed on a shaft 131 which is located slightly laterally outwardly of the body frame of the trailer. Thus, any material reaching the outside end of the conveyor 130 will fall off of the conveyor onto the ground. Suitable side rails 132 on either side of the conveyor 130 serve to retain material thereon from escaping off the sides of the same, except as noted hereinafter.

The transverse driven shaft 96 has fixed on an inner portion thereof a pulley 133 which is connected by way of a crossed belt 134 to a pulley 135 fixed on a second and forwardly-located transverse shaft 136, Figures 2 and 3. By crossing the belt 134 in a well known manner, the direction of rotation of the shaft 136 relative to the shaft 96 is reversed in a well known manner. The shaft 136 has fixed thereon suitable rollers and/or sprockets for an endless conveyor belt 137 which extends forwardly of the transverse conveyor 130 intermediate the ends thereof. Suitable idler rollers and/or sprockets are mounted on the transverse idler shaft 138 in the region of the transverse conveyor 130. Means to be described later are provided for transporting potatoes or the like from the conveyor 130 onto the conveyor 137, whereby the same are delivered forwardly to suitable containers, not shown, located on the platform or packing station 76 aforesaid. A frame member 139 extends across the forward end of the conveyor 137 and has pivoted thereto, as at 141, a gate 140 which is movable from the solid line position, Figure 2, to the broken line position, whereby to deliver potatoes or the like to one side or the other of the pivot 141. This arrangement permits two receptacles for potatoes to be alternately filled, whereby a full container can be removed from the platform 76 while an empty container is being filled.

The drive shaft 80 of the engine 79 has an extension extending laterally outwardly of the drive sprocket 81 and has fixed thereon a double pulley 142. A pair of belts 143 extending from the double pulley 142 drive a second double pulley 144 fixed on a transverse shaft 145. Laterally outwardly of the double pulley 144 the shaft 145 has fixed thereon a pulley 146 which is connected by a belt 147 to a pulley 148 on the shaft 149 of a rotary upstanding blower 150. The blower 150 is provided with a discharge spout 151, the discharge end 152 of which is relatively narrow and discharges a blast of air in the horizontally-disposed space between the under surface of the shaft 100 for the first-named trailer conveyor and the upper surface of the conveyor 119. Such blast of air is directed upwardly and is effective to blow vines and any remaining light spoil, such as sand or dirt, over the conveyor 119, whereby to separate the potatoes from any remaining light spoil. The provision of the double pulleys 142 and 144, together with the two belts 143, is to provide a safety factor in the event of the breakage of one belt. Thus, if one belt 143 breaks, the other is capable of driving the apparatus.

The opposite end of the shaft 145 has fixed thereon for rotation therewith a pulley 153 which drives a belt 154 which extends around a pulley 155 which is fixed on a shaft 156 of a second blower 157. The blower 157 is provided with a spout 158, the upper end 159 of which is restricted and is adapted to discharge a horizontally-directed blast of air forwardly across the upper run of the transverse conveyor 130. The direction of the blast of air discharged from the nozzle 159 is in alignment with the forwardly-extending conveyor 137. The blast of air delivered by the blower 157 is substantially strong and preferably stronger than the blast delivered by the blower 150, and is effective to roll the lighter vegetable material, such as the potatoes, off of the conveyor 130 and onto the forwardly-extending conveyor 137. The effect of this performance is to leave on the conveyor 130 nothing but heavy spoil, such as rocks or heavy lumps of dirt, which fall off the outer end of the conveyor 130 onto the ground. To protect an operator stationed on the platform 76 from the effects of the blast delivered by the nozzle 159, a blast deflector 160 of any suitable form, but preferably vertically disposed and forwardly and outwardly inclined, extends across the forwardly-extending terminal conveyor 137 between the ends thereof. The terminal conveyor 137 is provided with side rails 161 to maintain the potatoes or other vegetables thereon during their travel thereover.

While I have shown a pair of blowers 150 and 157, it is conceivable that they could be combined as a single blower having a pair of discharge spouts conforming to the spouts disclosed hereinbefore. With such arrangement, any variation in the velocity of the air blasts delivered by the spouts could be accomplished by enlarging or restricting the discharge nozzles.

From the foregoing, it is believed that the operation of the invention is readily understandable. In brief, such operation comprises the steps of digging the potatoes by the digger scoop 38, transportation of the dug potatoes, together with the spoil, rearwardly over the tractor-attached conveyor. From such conveyor the partially-sifted potatoes and spoil are deposited on the forward end of the first-named trailer-carried conveyor, which, being of slatted construction, operates to sift out virtually all of the fine spoil. At the upper end of such conveyor the potatoes and remaining spoil are forced to fall through the air blast from the blower nozzle 152, whereby the remaining light spoil including the vines are blown clear of the trailer and allowed to fall to the ground. Thereafter, the heavier spoil, together with the potatoes, fall onto the conveyor 119, are transported to the conveyor 130, and again subjected to an air blast by the nozzle 159. At this point the lighter potatoes readily roll off of the conveyor 130 onto the conveyor 157 and are transported to the packing station 76. Containers, not shown, for the potatoes delivered to such packing station are successively removed from such station by a truck crew in a well known manner, and empty containers substituted. By proper manipulation of the gate 140, an empty container may always be positioned below that portion of the discharge end of the conveyor 137 which is opened by the gate. While I have shown a pair of transverse conveyors 119 and 130, it is believed obvious that a single conveyor could be substituted therefor. In like manner, it may be possible to dispense with the conveyor 137 and substitute instead a downwardly-inclined chute. At the same time, the particular arrangement of conveyors is effective to utilize to the greatest advantage the available space on the trailer. As is apparent from Figure 2, the conveyors are disposed upon the trailer in a substantially U-shape, whereby virtually all of the available space on the trailer is utilizable. For instance, the space between the packing station 76 and the first conveyor may be floored over and whereby to comprise a storage space for empty containers. Also, it is noted from Figure 2 that the arrangement described enables the trailer to be of no greater width than the tractor, whereby it is readily passed through any opening through which the tractor may pass.

Although not specifically described, it is understood that the several parts, such as the engine 79, blowers 150 and 157, and the various driving and driven shafts, are suitably journaled in any well known manner and/or secured to the horizontal and vertical frame members 77 and 78 of the trailer.

Thus, while I have shown and described what is now thought to be the preferred forms of the invention, it is to be understood that the same is susceptible of other forms and expressions. Consequently, I do not limit myself to the precise structure shown and described hereinabove except as hereinafter claimed.

I claim:

1. In a towed apparatus for conveying, separating from spoil, and loading in containers a quantity of potatoes deposited thereon, a mobile frame rectangular in plan and having means extending from its front end connectable to a towing vehicle; a first conveyor aligned longitudinally with one side of the frame and extending from the front end to the rear end thereof to receive intermixed potatoes and spoil at the front end and move the same to the rear end of the frame, the first conveyor having cleats alternating with open spaces to effect gravitation of some of the spoil to the ground surface during said movement; a second conveyor arranged transversely of the frame at the rear end thereof and extending from said one side to the other side of the frame, said second conveyor having its head end positioned to receive material from the discharge end of the first conveyor and its discharge end projecting laterally of and beyond the other side of the frame; a first blower having its discharge end disposed between the discharge end of the first conveyor and the head end of the second conveyor and adapted to blow an additional quantity of spoil from the potatoes; a third conveyor aligned longitudinally with said other side of the frame and having its head end disposed adjacent one side of the second conveyor intermediate the ends of the second conveyor, the discharge end of the third conveyor being disposed proximate the front end of the frame; a second blower having its discharge end arranged transversely of the second conveyor and aligned longitudinally with the third conveyor to blow the potatoes laterally off the second conveyor onto the third conveyor while leaving the remaining spoil on the second conveyor for passage off the discharge end thereof; a platform mounted on the front end of the frame contiguous to said other side of the frame and to said discharge end of the third conveyor, the platform being adapted to support containers for the filling thereof with potatoes discharged from the third conveyor, said conveyors being arranged in the shape of a U extending about the respective sides and rear end of the frame and defining an open space at the center of the frame; and means mounted in said open space of the frame operatively linked to the respective conveyors and blowers for driving the same simultaneously.

2. In a towed apparatus for conveying, separating from the spoil, and loading in containers a quantity of potatoes deposited thereon, a mobile frame rectangular in plan and having means extending from its front end connectable to a towing vehicle; a first conveyor aligned longitudinally with one side of the frame and inclined upwardly from the front end to the rear end thereof to receive intermixed potatoes and spoil at the front end and move the same to the rear end of the frame, the first conveyor having cleats alternating with open spaces to effect gravitation of some of the spoil to the ground surface during said movement; a second, horizontally disposed conveyor elevated above and arranged transversely of the rear end of the frame and extending from said one side to the other side thereof, the second conveyor having its head end positioned to receive material from the discharge end of the first conveyor and its discharge end projecting laterally of and beyond the other side of the frame; a first blower underlying and aligned longitudinally with the first conveyor, said first blower having its discharge end disposed between the discharge end of the first conveyor and the head end of the second conveyor to blow an additional quantity of spoil from the potatoes; a third conveyor elevated above and aligned longitudinally with said other side of the frame and having its head end disposed adjacent one side of the second conveyor intermediate the ends of the second conveyor, the discharge end of the third conveyor being disposed proximate the front end of the frame; a second blower partially underlying and having its discharge end arranged transversely of the second conveyor in longitudinal alignment with the third conveyor, to blow the potatoes laterally off the second conveyor onto the third conveyor while leaving the remaining spoil on the second conveyor for passage off the discharge end thereof; a platform mounted on the front end of the frame contiguous to said other side of the frame and to said discharge end of the third conveyor, the platform being adapted to support containers for the filling thereof with potatoes discharged from the third conveyor, said conveyors being arranged in the shape of a U extending about the respective sides and rear end of the frame and defining an open space at the center of the frame; and means mounted in said open space at the center of the frame operatively linked to the respective conveyors and blowers for driving the same simultaneously.

SIMON J. LEVESQUE.

REFERENCES CITED

The following references are of record in the file of this patent:

UNITED STATES PATENTS

| Number | Name | Date |
|---|---|---|
| 1,103,163 | Thompson | July 14, 1914 |
| 1,178,857 | Kirner | Apr. 11, 1916 |
| 1,296,105 | Navratil | Mar. 4, 1919 |
| 1,671,263 | Zuckerman | May 29, 1928 |
| 1,715,198 | Hist | May 28, 1929 |
| 1,715,218 | Wright et al. | May 28, 1929 |
| 1,815,503 | Gookin | July 21, 1931 |
| 1,921,190 | Johnson | Aug. 8, 1933 |
| 1,973,707 | Hebley et al. | Sept. 18, 1934 |
| 2,215,516 | Schooler | Sept. 24, 1940 |
| 2,373,426 | Spafford | Apr. 10, 1945 |
| 2,381,172 | Lundberg | Aug. 7, 1945 |
| 2,458,224 | Thompson | Jan. 4, 1949 |
| 2,535,598 | Pappie | Dec. 26, 1950 |
| 2,535,801 | La Pointe | Dec. 26, 1950 |
| 2,546,411 | Vella | Mar. 27, 1951 |